(12) United States Patent
Ohashi et al.

(10) Patent No.: US 7,444,083 B2
(45) Date of Patent: Oct. 28, 2008

(54) OPTICAL FIBER TRANSMISSION SYSTEM WITH A PLURAL EMITTING POINT TRANSMITTER

(75) Inventors: Yuichi Ohashi, Tokyo (JP); Kenji Matsumoto, Ashigarakami-gun (JP); Hiroyuki Hiiro, Ashigarakami-gun (JP); Yoshisada Nakamura, Fujinomiya (JP); Mikihiko Kato, Tokyo (JP); Osamu Ueno, Ashigarakami-gun (JP); Tsutomu Hamada, Ashigarakami-gun (JP); Shinya Kyozuka, Ashigarakami-gun (JP); Hideo Nakayama, Ebina (JP); Tomo Baba, Ashigarakami-gun (JP)

(73) Assignees: Fuji Photo Film Co., Ltd., Minami-Ashigara (JP); Fuji Xerox Co., Ltd., Tokyo (JP)

( * ) Notice: Subject to any disclaimer, the term of this patent is extended or adjusted under 35 U.S.C. 154(b) by 519 days.

(21) Appl. No.: 10/886,650

(22) Filed: Jul. 9, 2004

(65) Prior Publication Data
US 2005/0031354 A1 Feb. 10, 2005

(30) Foreign Application Priority Data
Jul. 14, 2003 (JP) ............................. 2003-274332
Jun. 15, 2004 (JP) ............................. 2004-177296

(51) Int. Cl.
*H04B 10/00* (2006.01)
*H04B 10/12* (2006.01)
*H01S 5/00* (2006.01)
*H01S 3/08* (2006.01)

(52) U.S. Cl. .................. 398/156; 398/142; 398/200; 372/46.013; 372/29.022; 372/103

(58) Field of Classification Search ................ 398/141, 398/142, 156, 200, 212; 372/46.013, 29.022, 372/29.015, 103
See application file for complete search history.

(56) References Cited

U.S. PATENT DOCUMENTS 5,946,121 A 8/1999 Jiang et al.

(Continued)

FOREIGN PATENT DOCUMENTS

CN 1178418 A 4/1998

(Continued)

OTHER PUBLICATIONS

Eisuke Nihei et al.; "High-bandwidth, graded-index polymer optical fiber for near-infrared use"; *Applied Optics*; vol. 35, No. 36; Dec. 20, 1996; pp. 7085-7090; XP 000679241.

(Continued)

*Primary Examiner*—Jason Chan
*Assistant Examiner*—Nathan M Curs
(74) *Attorney, Agent, or Firm*—Oliff & Berridge, PLC (57) ABSTRACT

In an optical signal transmission system which can perform high-speed optical transmission not lower than 1 Gbps, VCSEL has light-emission points. A core diameter of an optical fiber GI-POF is set to not lower than 200 μm, and the light-emission points of VCSEL are arranged inside an outer periphery at an end face of GI-POF. A polymerization composition material constituting the core of GI-POF is made of a compound containing deuterated poly methacrylic ester. A wavelength of the light beam of VCSEL is set to the range of 770 nm to 810 nm.

10 Claims, 4 Drawing Sheets

U.S. PATENT DOCUMENTS

| | | | |
|---|---|---|---|
| 6,320,893 B1 | 11/2001 | Ueki | |
| 6,510,265 B1 | 1/2003 | Giaretta et al. | |
| 6,750,294 B2 | 6/2004 | Sugiyama et al. | |
| 6,863,453 B2 * | 3/2005 | Wang et al. | 385/94 |
| 2002/0031154 A1 | 3/2002 | Yokouchi et al. | |
| 2003/0039294 A1 * | 2/2003 | Ueki et al. | 372/96 |
| 2003/0091275 A1 | 5/2003 | Hamada et al. | |
| 2003/0096439 A1 * | 5/2003 | Lee et al. | 438/47 |
| 2004/0028103 A1 * | 2/2004 | Ueki | 372/46 |
| 2005/0098788 A1 * | 5/2005 | Plass et al. | 257/95 |

FOREIGN PATENT DOCUMENTS

| | | |
|---|---|---|
| CN | 1329260 A | 1/2002 |
| EP | 1 276 188 A | 1/2003 |
| JP | A-58-149003 | 9/1983 |
| JP | A 11-121867 | 4/1999 |
| JP | A 2000-022643 | 1/2000 |
| JP | A 2000-165355 | 6/2000 |
| JP | A 2001-284702 | 10/2001 |
| JP | 2003-152284 * | 5/2003 |
| JP | A 2003-152284 | 5/2003 |

OTHER PUBLICATIONS

Weng W. Chow et al.; "Design, Fabrication, and Performance of Infrared and Visible Vertical-Cavity Surface-Emitting Lasers"; *IEEE Journal of Quantum Electronics*; vol. 33, No. 10; Oct. 1997; pp. 1810-1824; XP-000722270.

Hideo Nakayama et al.; "780nm VCSELs for Home Networks and Printers"; *2004 Electronic Components and Technology Conference*; Jun. 1, 2004; pp. 1371-1375; XP-010715350.

* cited by examiner

OPTICAL FIBER TRANSMISSION SYSTEM WITH A PLURAL EMITTING POINT TRANSMITTER

CROSS-REFERENCE TO RELATED APPLICATION

This application claims priority under 35 USC 119 from Japanese Patent Applications No. 2003-274332 and No. 2004-177296, the disclosure of which is incorporated by reference herein.

BACKGROUND OF THE INVENTION

1. Field of the Invention

The present invention relates to an optical signal transmission system, particularly to the optical signal transmission system which enables high-speed optical data transmission more than 1 Gbps (bit per second).

2. Description of the Related Art

In the optical signal transmission system, in order to lengthen lifetime of a vertical cavity surface emitting laser diode (hereinafter referred to as VCSEL) light source and in order to cover output of VCSEL even if electric current is lowered, an example is Japanese Patent Application Laid-Open (JP-A) No. 2003-152284. This discloses a system in which a plurality of light sources is used and the light sources are arranged within the range smaller than an end face of a light guide path.

In this technology, in order to enable the high-speed transmission not lower than 1 Gbps in multi-mode transmission, a step index type (SI type) plastic optical fiber (hereinafter referred to as POF) can not be used as the light guide path. In a perfluorinated optical fiber which is used in GI-POF (Graded Index type Plastic Optical Fiber), transmission loss is generated because mode noise is generated in the optical fiber having a relatively small diameter. Further, because the optical fiber has such a small diameter, efficient coupling from the plurality of VCSEL light sources to the end face of the light guide path is difficult, and cost becomes higher.

SUMMARY OF THE INVENTION

In view of the foregoing, a new optical signal transmission system is demanded, in which the light guide path is effectively coupled to a long-life VCSEL light source and the high-speed transmission not lower than 1 Gbps can be performed while the generation of the mode noise is suppressed.

An optical signal transmission system of the invention comprises a refractive-index profile optical fiber in which a core diameter outputting an optical signal incident from one end from the other end is not lower than 200 µm, a vertical cavity surface emitting laser diode which is arranged at one end of the optical fiber, the vertical cavity surface emitting laser diode having a plurality of light-emission points outputting light beams toward an end face of the optical fiber, the vertical cavity surface emitting laser diode outputting the light beams having the substantially same wavelength as the wavelength in which transmission loss of the optical fiber becomes smaller from the light-emission points, and a light receiving element which is arranged at the other end of the optical fiber, the light receiving element receiving the light signal outputted from the end face of the optical fiber.

Then, action of the optical signal transmission system of the invention will be described.

In the optical signal transmission system, the optical signals (light beams) are emitted from the plurality of light-emission points of VCSEL to be incident to one end of the refractive-index profile optical fiber which is of the light guide path.

The incident optical signal is outputted from the other end through the refractive-index profile optical fiber, and the light receiving element receives the optical signal outputted from the refractive-index profile optical fiber.

Since VCSEL having the plurality of light-emission points is used in the optical signal transmission system, assuming that optical output is the same at each light-emission point, when VCSEL having the plurality of light-emission points is compared with VCSEL having one light-emission point, heat generation per light-emission point can be reduced in VCSEL having the plurality of light-emission points, and the longer life of VCSEL can be realized.

Because the core diameter of the refractive-index profile optical fiber is set to not lower than 200 µm in the optical signal transmission system, coupling loss for axial shift during the coupling can be prevented from worsening, and alignment between the refractive-index profile optical fiber and VCSEL and the alignment between the refractive-index profile optical fiber and the light receiving element also become easier.

The core diameter of the optical fiber is often increased for measures against the axial shift. However, when the core diameter exceeds to 1000 µm, the amount of material required for the optical fiber becomes excessively larger and cost is increased. Consequently, advantages for the axial shift will reach saturation.

In the optical signal transmission system, VCSEL emits the light beam having the substantially same wavelength as the wavelength in which the transmission loss of the refractive-index profile optical fiber becomes smaller from the light-emission point. With this emission, high-speed optical transmission not lower than 1 Gbps is securely performed.

"The wavelength in which the transmission loss of the optical fiber becomes smaller" means the wavelength in which the transmission loss of the optical fiber becomes not greater than 500 dB/Km. The transmission loss of the optical fiber is often not greater than 300 dB/Km, or not greater than 200 dB/Km.

In the optical signal transmission system of the invention, a wavelength of the light beam emitted from the vertical cavity surface emitting laser diode may range from 770 nm to 810 nm.

Then, in the case of the above-described setting, the action of the optical signal transmission system will be described.

For example, in the refractive-index profile optical fiber in which the polymerization composition material constituting the core is made of a compound containing deuterated poly methacrylic ester, the transmission loss can be reduced in the wavelength range from about 770 nm to about 810 nm. Therefore, the transmission loss can be reduced by setting the wavelength of the light beam emitted from VCSEL to the range from 770 nm to 810 nm.

In the optical signal transmission system of the invention, the plurality of light-emission points may be arranged inside an outer periphery of the core at the end face of the optical fiber.

Then, the action of the optical signal transmission system in this case will be described.

The light beam is emitted from the light-emission point while slightly diffused. Therefore, the light beam emitted from the light-emission point can be effectively received at the end face of the optical fiber by arranging the plurality of light-emission points inside the outer periphery of the core at the end face of the optical fiber.

In the optical signal transmission system of the invention, the optical fiber may be a refractive-index profile plastic fiber, and a light hydrogen content of a C—H bond in a core polymer may not be more than 60 mg per gram of polymer.

Then, the action of the optical signal transmission system in this case will be described.

Since the refractive-index profile optical fiber made of synthetic resin is used as the optical fiber in the optical signal transmission system, the optical fiber made of the synthetic resin has vibration resistance and bending resistance and the laying of the optical fiber is easy to perform, when compared with a glass fiber.

The optical fiber is formed by the refractive-index profile plastic fiber and the light hydrogen content of the C—H bond in the core polymer is set to not more than 60 mg per gram of polymer. Therefore, when a near infrared light source having the wavelength not lower than 770 nm is used, the wavelength range where the transmission loss is generated can be moved to the longer wavelength range to reduce the loss of the transmission signal light beam.

In the optical signal transmission system of the invention, the light hydrogen of the C—H bond in the core polymer of the optical fiber may be made of deuterated polymer or halogenated polymer.

Then, the action of the optical signal transmission system in this case will be described.

The action of the optical signal transmission system in this case can be realized at low cost in such a manner that the light hydrogen of the C—H bond in the core polymer of the optical fiber is made of deuterated polymer or halogenated polymer.

In the optical signal transmission system of the invention, the polymer may be a deuterated poly (meth)acrylic ester compound.

Then, the action of the optical signal transmission system in this case will be described.

Production cost and material cost can be suppressed at a lower level in such a manner that the polymer is made of deuterated poly (meth)acrylic ester. Particularly, the transmission loss can be reduced by combination of the core made of deuterated poly (meth)acrylic ester and VCSEL having the wavelength of light beam in the range from 770 nm to 810 nm.

In the optical signal transmission system of the invention, the light receiving element may be an MSM type photodiode.

Then, the action of the optical signal transmission system in this case will be described.

The optical signal can be received at high speed in such a manner that the light receiving element is formed by the MSM type photodiode.

In the optical signal transmission system of the invention, the core diameter of the optical fiber may range from 250 μm to 900 μm.

Then, the operation of the optical signal transmission system in this case will be described.

A balance between the cost and the axial shift measures is achieved by setting the core diameter of the refractive-index profile optical fiber within the range from 250 μm to 900 μm.

A second aspect of the present invention is an optical signal transmission system comprising an optical fiber which transmits an optical signal, a vertical cavity surface emitting laser (VCSEL) diode which is provided for emitting a light beam to an end surface of the optical fiber; and a light receiving element which is provided to an opposite end side to the side of the end surface of the optical fiber and receives the light beam emitted from an end of the optical fiber. In this system, the vertical cavity surface emitting laser diode includes a plurality of light emission points in which light beams are emitted simultaneously and a divergent angle of the emitted light beam is equal to or smaller than 23 degrees.

An operation of this system is explained as follows.

In this system of the second aspect of the invention, each of the light emission points of the VCSEL diode emits a light beam. The emitted light beam is incident on an end surface of the optical fiber. The light beam coming from the other end surface of the optical fiber is received by the light receiving element. Because a smaller divergent angle of light beam facilitates incident of the optical fiber, the divergent angle of the emitted light beam is equal to or smaller than 23 degrees.

In some cases, the divergent angle may be equal to or smaller than 21 degrees.

In this system, the optical fiber may be a graded index type plastic optical fiber (GI-POF).

In this system, the vertical cavity surface emitting laser may include a constriction layer of electric current, the constriction layer may be selectively oxidized and an oxidized aperture may be formed in the constriction layer with a diameter equal to or smaller than 11 μm.

With setting a diameter of the oxidized aperture not to be greater than 11 μm, a divergent angle will become equal to or smaller than 23 degrees.

As described above, the optical signal transmission system of the invention has the above-described configuration, so that at least the following effects are obtained.

(1) Because VCSEL having the plurality of light-emission points is used as the light source, assuming that the optical output is the same at each light-emission point, when VCSEL having the plurality of light-emission points is compared with VCSEL having one light-emission point, the heat generation per light-emission point can be reduced in VCSEL having the plurality of light-emission points, and the longer life of VCSEL can be realized.

(2) Because the core diameter of the refractive-index profile optical fiber is set to not lower than 200 μm, the coupling loss for the axial shift during the coupling can be prevented from worsening, the alignment between the refractive-index profile optical fiber and VCSEL and the alignment between the refractive-index profile optical fiber and the light receiving element also become easier, and the generation of the mode noise can be prevented. The mode noise is easy to generate; when the core diameter is smaller and the axial shift during the coupling is larger. Therefore, influence of the axial shift can be suppressed by increasing the core diameter. The mode noise can be observed by an S/N ratio or the spread of an eye in an eye pattern.

DETAILED DESCRIPTION OF THE INVENTION

Preferred embodiments of the present invention will be specifically described below referring to the accompanying drawings.

Figure 1:
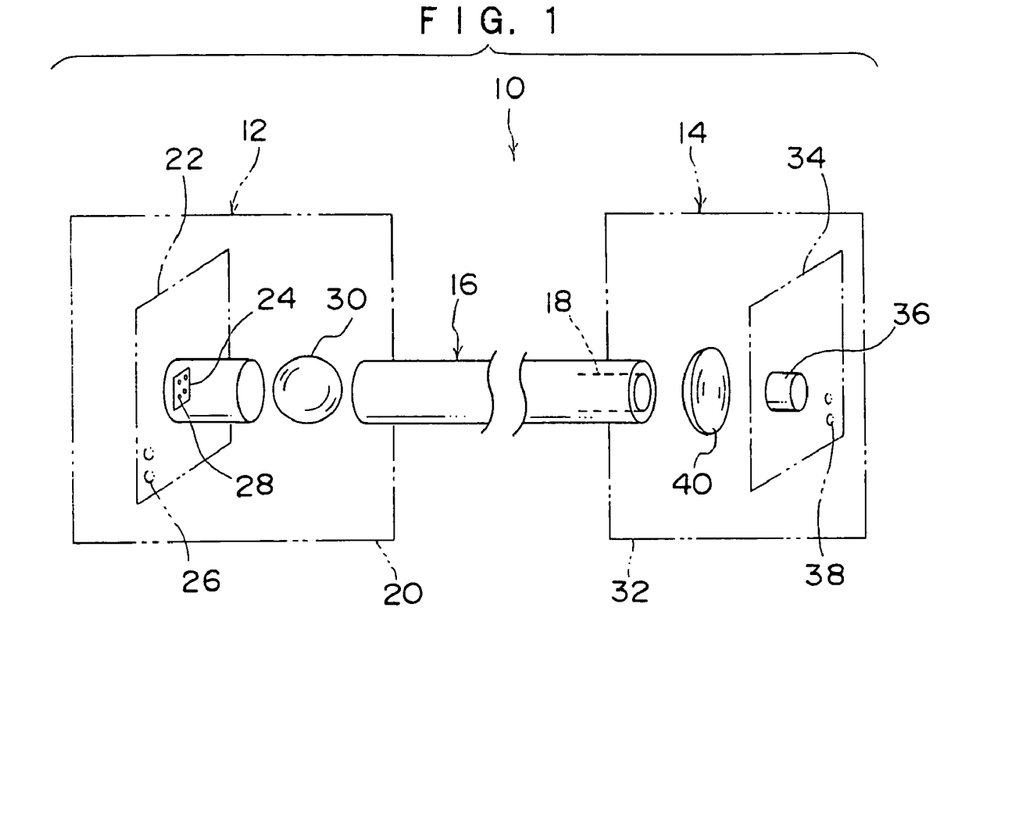
FIG. 1 is a schematic view of an optical signal transmission system according to an embodiment of the present invention.

As shown in FIG. 1, an optical signal transmission system 10 of the embodiment includes a transmission unit 12, a reception unit 14, and an optical fiber cable 16 which couples the transmission unit 12 and the reception unit 14.

Detail of Optical Fiber Cable

In the optical fiber cable 16 of the embodiment, GI-POF 18 is used as the optical fiber.

GI-POF 18 of the embodiment is the optical fiber which has the refractive index profile. Any GI-POF can be applied to the optical fiber as long as GI-POF has the refractive index profile and the core diameter not lower than 200 μm. The plastic optical fiber (GI-POF) having the refractive index profile is commonly used because of easy cable laying, end-face working characteristics, and interior wiring safety. When the plastic fiber is used for the near infrared light source having the wavelength not lower than 770 nm, absorption loss is caused by low overtone absorption of stretching vibration of the C—H bond which constitutes the optical fiber. Therefore, the wavelength range where the transmission loss is generated can be lengthened to reduce the loss of the transmission signal light, when the core portion is made of polymers in which a heavy hydrogen atom or a halogen atom such as a fluorine atom is substituted for a light hydrogen atom in the C—H bond (for example, as described in WO 93/08488, JP-A No. 58-149003, and JP-A No. 10-293215, the polymers such as polymethyl methacrylate deuteride (PMMA-d8.d5.d3), polymethyl methacrylate tert-buthyl-d14, polyfluoroethyl methacrylate (P3FMA), and polyhexafluoro isopropyl-2-fluoroacrylate (HFIP2-FA)). As described in JP-A No. 8-5848, GI-POF made of perfluorinated resin may be used. However, in GI-POF made of the perfluorinated resin, material production characteristics have no advantage, production cost is higher, and a fine adjustment such as a fused diffusion method and a multi-layer dip coating method is required in making a perform, when compared with the polymers of acryl ester monomers or methacrylic ester monomers in which a content of the light hydrogen in the C—H bond is decreased. Therefore, the polymers of acrylic ester monomers or methacrylic ester monomers are commonly used rather than the perfluorinated resin. (Meth)acrylic esters such as no-fluorine-containing (meth)acrylic ester and fluorine containing (meth)acrylic ester, styrene compounds, and vinyl esters can be cited as examples of the polymerization monomers which are often used. The core portion can be made of a mixture of a copolymer containing at least two homopolymers of the above-described materials or monomers of the above-described materials and the homopolymer and/or the copolymer. A composition containing (meth)acrylic esters in these materials as the polymerization monomer may be used.

The core composition material of the invention is commonly made by the polymerization from the polymerization composition material containing at least the above-described monomer, a polymerization initiator, and the compound whose refractive index is different from that of the polymerization monomer.

The embodiment of the refractive-index profile plastic fiber having the core portion and the clad portion, which is used for the invention as a preferred mode, will be described below.

The embodiment mainly includes two types. However, the invention is not limited to the following embodiments.

A first embodiment is the method of manufacturing a plastic optical member. The method includes a first process of polymerizing the polymerization composition material for the clad portion to produce a cylindrical pipe which becomes the clad portion, a second process in which an area which becomes the core portion is formed by interfacial gel polymerization of the polymerization composition material for forming the core portion in a hollow portion of the cylindrical pipe to produce the perform having areas respectively corresponding to the core portion and the clad portion, and a third process of forming the obtained perform in the desired form. For example, WO 93/08488 can be cited as a reference.

A second embodiment is the method of manufacturing the plastic optical member. The method includes the first process in which the cylindrical pipe including two layers is produced by polymerizing the polymerization composition material for an outer clad to produce an outer core layer on an inner wall surface of the hollow portion of the cylindrical pipe made of fluorine containing resin such as polyvinylidene fluoride resin, the second process in which the area which becomes the inner core portion is formed by the interfacial gel polymerization of the polymerization composition material for forming the inner core portion in the hollow portion of the cylindrical pipe to produce the perform having areas respectively corresponding to the clad portion, the outer core portion, and the inner core portion, and the third process of forming the obtained perform in the desired form. For example, JP-A No. 10-293215 can be cited as a reference.

In the second embodiment, when the concentric two-layer cylindrical pipe is produced, the pipe may be produced by the one-step method of fusion-co-extruding fluororesin and the polymer of the polymerization composition material for the outer core portion rather than the above-described step-by-step manner.

The polymerization composition materials for forming the clad portion and the outer core portion may contain a chain transfer agent or the like in addition to poly methacrylic ester deuterate which is often used as the polymerization monomer and the polymerization initiator which starts the polymerization of the polymerization monomer.

The polymerization composition materials for forming the core portion or the inner core portion contain poly methacrylic ester deuterate commonly used as the polymerization monomer, the polymerization initiator starting the polymerization of the polymerization monomer the chain transfer agent, and, if necessary, the compound whose refractive index is different from that of the monomer (refractive-index control component: dopant).

In the second embodiment, a decrease in adhesion properties caused by material difference between the clad portion and the core portion and the decrease in productivity are reduced by forming the outer core portion between the clad portion and the core portion.

The fluorine-containing resin, in which hydrophobicity is high and the difference in refractive index between the clad portion and the core portion can be increased, is commonly used as the clad portion in the second embodiment. Specifically, polyvinylidene fluoride resin or the like is commonly used.

For the cylindrical pipe corresponding to the clad portion, the pipe having the desired diameter and thickness can be formed by fusion-extruding the commercially available fluororesin.

The outer core layer can be formed on the inner wall of the hollow portion of the obtained pipe by rotation-polymerizing the polymerization composition material in the hollow portion of the pipe. A similar structure may be produced by the co-extrusion of the polymer containing the fluororesin and the polymerization composition material.

In using the polymerization composition material of the embodiment to produce the optical member, the refractive-index profile optical member may be produced by using the refractive-index control component to make a slope in concentration of the refractive-index control component.

The method of making the slope in the concentration of the refractive-index control component includes, e.g. the method of utilizing the interfacial gel polymerization described in WO 93/08488, WO 03/019252, JP-A Nos. 2003-75656, and 2003-149463.

The polymerization composition materials for forming the clad portion and the outer core portion can be maid of the polymerization initiator and the chain transfer agent, which are described in WO 93/08488, WO 03/019252, JP-A Nos. 10-293215, 2003-75656, and 2003-149463. The polymerization composition materials for forming the core portion can be made of the polymerization initiator, the chain transfer agent, and the refractive-index control component, which are described in the above-described references.

In addition to the methods described in WO 93/08488, WO 03/019252, JP-A Nos. 2003-75656, and 2003-149463, the well-known technologies and the technologies described in Japanese Patent Application Nos. 2002-346250 and 2002-188181 can be applied to the producing method of each process.

The core diameter of GI-POF 18 ranges from 200 to 1000 μm. The core diameter of GI-POF 18 frequently ranges from 250 to 900 μm or ranges from 300 to 800 μm.

Detail of Transmission Unit

The transmission unit 12 includes a casing 20 and a transmission substrate 22.

The transmission unit 22 includes VCSEL 24, an electric signal input unit 26, a circuit (not shown) which converts the electric signal into the optical signal to drive VCSEL 24.

The technologies described in JP-A No. 2003-152284, JP-A No. 11-121867, and the like can be used as VCSEL 24.

Figure 2:
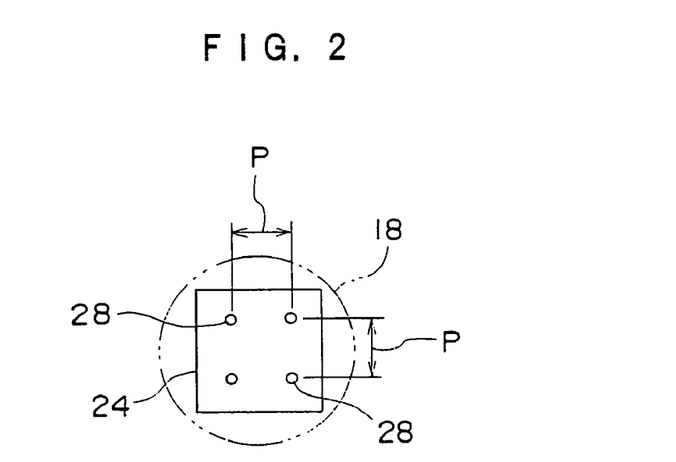
FIG. 2 is a front elevation of VCSEL.
Figure 4:
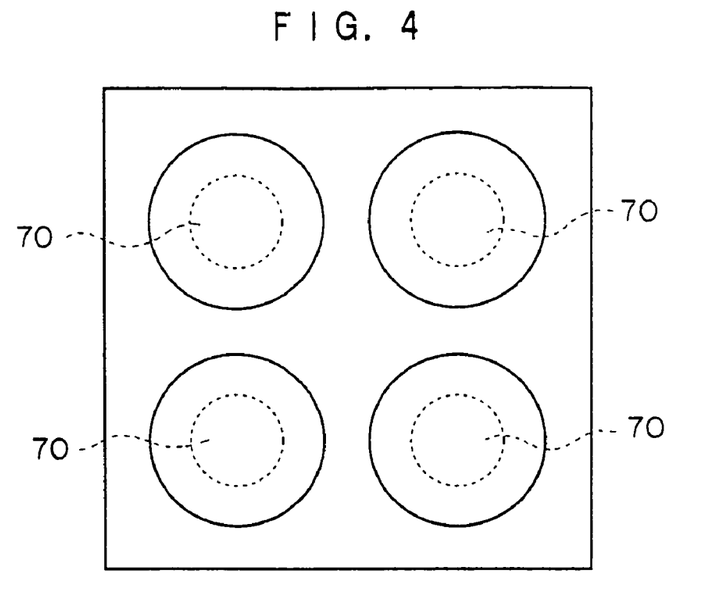
FIG. 4 is a plan view of light emission points of a VCSEL.
Figure 5:
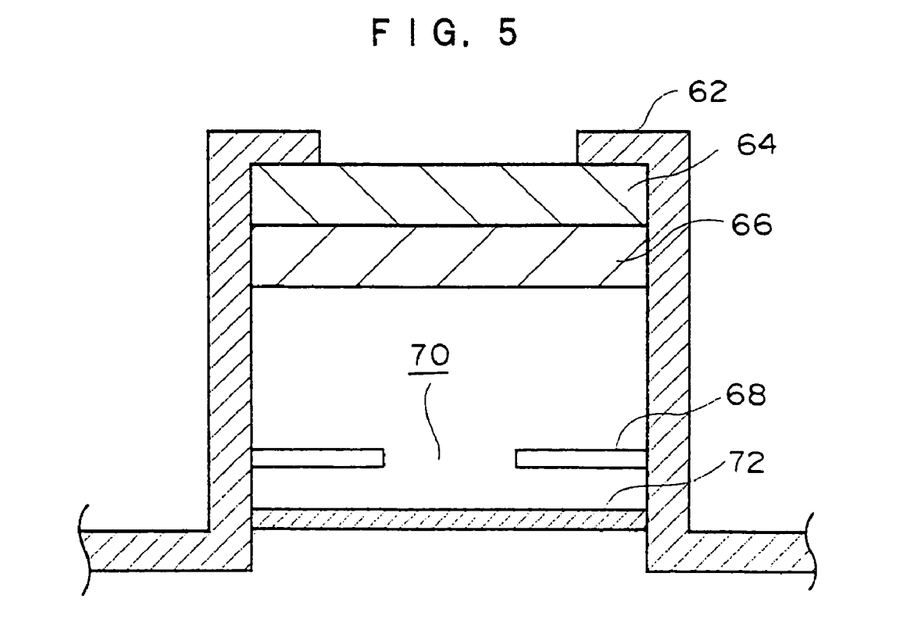
FIG. 5 is a cross-section of light emission points shown in FIG. 4.
Figure 6:
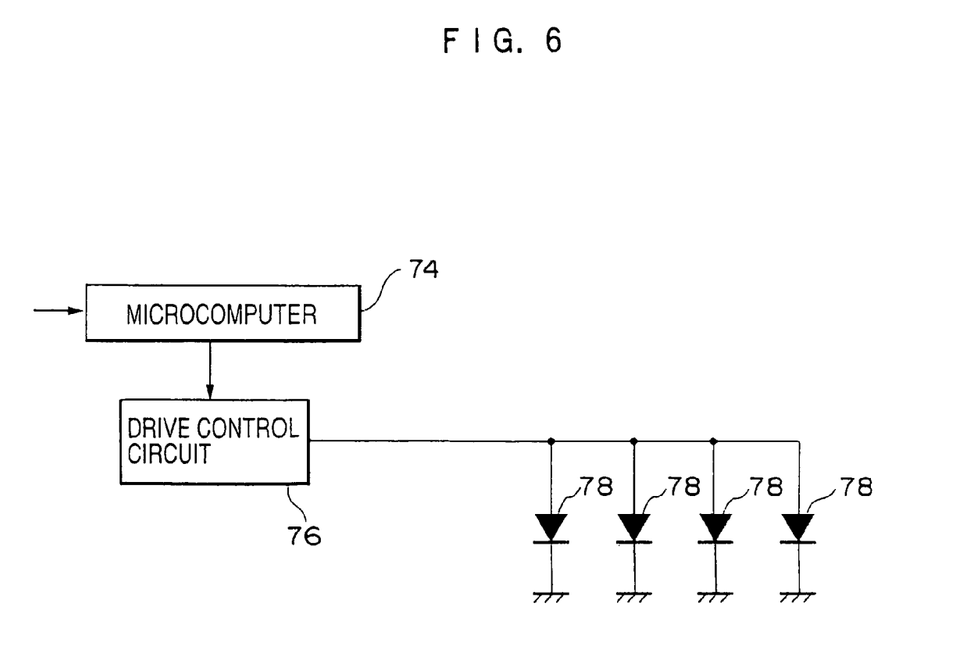
FIG. 6 is a circuit diagram of the VCSEL shown in FIG. 4.

VCSEL 24 of the embodiment emits the laser beam whose central wavelength is 780 nm and power is about 3 mW. As shown in FIG. 2, VCSEL 24 of this embodiment has four light-emission points 28 (two by two lattice-shaped arrangement), and the light-emission points are arranged with a pitch (P) of 50 μm. FIGS. 4 and 5 each show a general structure of VCSEL 24 of this embodiment. One of the light-emission points has a cylindrical mesa structure. This structure includes an upper metal electrode 62 for supplying driving current, an upper contact layer 64 into which the current from the upper metal electrode 62 is passed through the emitted light beam and guided, an upper DBR mirror layer 66, a constriction 68 of electric current which is selectively oxidized from a mesa side surface to an inner portion at about 9 μm in diameter, and an activated layer 72. A center portion of the mesa structure, which is inside of the constriction 68, is called an oxidized aperture 70. FIG. 6 is a diagram of the circuit of the VCSEL 24 shown in FIG. 4. Four emission points are simultaneously driven by an identical driving signal. In FIG. 6, the numeral 74 represents a microcomputer, the numeral 76 represents a driving control circuit which generates a driving signal, and the numeral 78 represents emission points.

A non-oxidized portion or the oxidized aperture 70, of the core of the constriction 68 of electric current has a diameter in the range from 8 μm to 11 μm. In the non-oxidized portion, a light beam is emitted with a divergent or spreading angle of about 21 degrees. The divergent angle is defined as the angle whose power is 1 by $e^2$ of the peak value. Generally, the smaller the divergent angle becomes, the easier an incidence will be to an optical fiber. When following this, on the other hand, the smaller an oxidized aperture becomes, the shorter the life of the fiber will become. A reasonable answer to this contradiction, a divergent angle is often set not to be greater than 23 degrees, sometimes not to be greater than 21 degrees, or not to be greater than 19 degrees.

Here, when a different optical fiber, one with a far greater diameter for example, is employed, the light-emission points may be arranged in the four-by-four lattice shape as disclosed by JP-A No. 2003-152284. Alternatively, the light-emission points may be arranged in the concentric shape or other arrays. Whatever an arrangement may be, a pitch P between two adjacent emission points should be set in the range from 40 μm to 50 μm in order to obtain light beams substantially the same in quality as the beam from the single emission point of the VCSEL 24.

Although VCSEL sealed in a metal can package is shown in FIG. 1, the invention is not limited to VCSEL shown in FIG. 1.

As shown in FIG. 1, the optical fiber 16 is coupled to the casing 20 with a connector (not shown).

At this point, in the coupling between GI-POF 18 and VCSEL 24, butt coupling may be used, in which an outgoing face of VCSEL 24 is directly coupled to GI-POF 18. Alternatively, light fluxes may be guided to be parallel by using an aspherical lens or a ball lens to be guided to the light guide path, or optical paths may be converged to couple GI-POF 18 and VCSEL 24.

As shown in FIG. 2, the plurality of light-emission points 28 is arranged inside the outer periphery (shown by a chain double-dashed line) of the end face of GI-POF 18.

As shown in FIG. 1, in the embodiment, a ball lens 30 is arranged between VCSEL 24 and the end face of GI-POF 18.

The light fluxes emitted from the VCSEL 24 are focused onto the incident end face of GI-POF 18 with the same magnification by using the ball lens 30.

Detail of Reception Unit

The reception unit 14 includes a casing 32 and a reception substrate 34.

The reception substrate 34 includes a light receiving element 36, an electric signal output unit 38, and a circuit (not shown) which converts the optical signal into the electric signal.

Such a photodiode (PD) as a high-speed silicon PIN photodiode or a gallium arsenide PIN photodiode and the MSM (Metal-Semiconductor-Metal) photodiode can be used as the light receiving element 36. Other light receiving elements may be employed.

In the embodiment, the gallium arsenide PIN photodiode whose light receiving surface has the diameter of 100 μm is used as the light receiving element 36.

The optical fiber 16 is connected to the casing 32 with the connector (not shown).

At this point, in the coupling between GI-POF 18 and the light receiving element 36, the butt coupling may be used in which an outgoing light from GI-POF 18 is directly coupled to the light receiving element 36. Alternatively, light fluxes may be guided to be parallel by using the aspherical lens or the ball lens to be guided to the light guide path, or optical paths may be converged to couple GI-POF 18 and the light receiving element 36.

In the embodiment, an aspherical lens (convex lens) 40 is arranged between the light receiving element 36 and the end face of GI-POF 18 to form reduction system coupling having a reduction ratio of 3:1, and the light beam outputted from GI-POF 18 is focused by the aspherical lens (convex lens) 40 to be incident to a light receiving surface of the light receiving element 36.

The photodiode which can perform the high-speed operation and have light receiving surface of the larger diameter, e.g. the MSM photodiode having the light receiving surface diameter of 250 μm can be also used in the embodiment. In this case, the reduction ratio of the aspherical lens 40 can be decreased. Depending on the core diameter of GI-POF, there is an advantage that the low-cost lens having the same magnification coupling can be used or the butt coupling can be realized with no lens.

Operation

Then, the operation of the optical signal transmission system 10 of the embodiment will be described.

For example, the optical signal transmission system 10 of the embodiment is preferable in the case where a video signal having a large quantity of information, which is outputted from a computer, is transmitted to a display.

As shown in FIG. 1, a video signal output unit (not shown) of the computer is connected to the electric signal input unit 26 of the transmission unit 12 through an electric cable, and a video signal input unit (not shown) of the display is connected to the electric signal output unit 38 of the reception unit 14 through the electric cable.

In the transmission unit 12, the electric signal is converted into the optical signal to output the optical signal (light beam) from each light-emission point 28 of VCSEL 24, and the optical signal is transmitted to the reception unit 14 through the ball lens 30 and the optical fiber cable 16 (GI-POF 18).

In the reception unit 14, the optical signal is inputted to the light receiving element 36 through the aspherical lens (convex lens) 40, and the optical signal is converted into the electric signal to be outputted to the display.

In the optical signal transmission system 10 of the embodiment, since VCSEL 24 includes the plurality of light-emission points 28, heat generation per light-emission point can be reduced and the life of VCSEL 24 can be lengthened, when compared with the case in which VCSEL has one light-emission point 28.

The core diameter of GI-POF 18 is set to not lower than 200 μm and the light-emission points 28 of VCSEL 24 are arranged inside the outer periphery of the end face of GI-POF 18, so that the coupling loss for axial shift during the coupling can be prevented from worsening. Further, the alignment between GI-POF 18 and VCSEL 24 and the alignment between GI-POF 18 and the light receiving element 36 also become easier.

In the optical fiber cable 16, since GI-POF 18 made of the synthetic resin is used as the optical fiber, the optical fiber made of the synthetic resin has the vibration resistance and the bending resistance and the laying of the optical fiber is easy to perform, when compared with the glass fiber.

GI-POF 18 is used as the optical fiber, the polymerization composition material constituting the core of the GI-POF 18 is made of the compound containing deuterated poly methacrylic ester, and the wavelength of the light beam of VCSEL 24 is set within the range from 770 nm to 810 nm. Therefore, the transmission loss is reduced and the high-speed optical transmission not lower than 1 Gbps is securely performed.

EXAMPLE

In order to confirm the effect of the present invention, an example of the optical signal transmission system to which the invention is applied and the optical signal transmission systems of comparative examples were manufactured by way of trial, and the example and the comparative example were compared to each other in the transmission loss, a band width, coupling efficiency, and light source life.

Description of Testing System

Example 1

The optical fiber having the central wavelength of 780 nm is used for VCSEL.

The number of light-emission points is four (two-by-two lattice shape) and the light-emission points were arranged with the pitch of 50 μm.

The following composition materials were used for making GI-POF.

The production of GI-POF which uses MMA-d8 as a raw material will be described.

The vinylidene fluoride resin pipe is produced by the extrusion with KF-850 (product of Kureha Chemical Industry Co., Ltd.), the inner diameter of the pipe is 22 mm, the length is 600 mm, and a bottom portion of the pipe is also made of KF-850. A predetermined amount of deuterated methyl methacrylate (MMA-d8) is injected into the vinylidene fluoride resin pipe. In the deuterated methyl methacrylate, hydroquinone monomethyl ether as a polymerization inhibitor is removed and moisture content is removed up to not more than 80 ppm.

A mixed solution, in which 0.5% by mass dimethyl azobisisobutyrate (MAIB) is dispensed as the polymerization initiator into a monomer solution and 0.4% by mass n-lauryl mercaptan is dispensed as the chain transfer agent into the monomer solution, is injected into the vinylidene fluoride resin pipe.

A polymerization vessel in which the monomer mixed solution is injected is put into a hot water bath having a temperature of 70° C., and pre-polymerization is performed for two hours while shaking is added to the polymerization vessel.

The polymerization vessel is maintained in a horizontal state (height direction of the cylinder becomes horizontal) at 65° C. for one hour, and then the polymerization vessel is maintained in the horizontal state at 70° C. for three hours. Then, the polymerization vessel is heated and polymerized while rotated at 3000 rpm. Then, heat treatment is performed at 90° C. for 24 hours to obtain the cylindrical pipe made of the above-described polymer.

The monomer (MMA-d8) which is of the raw material of the core portion and 7% by mass diphenyl sulfide is mixed as the dopant into the monomer solution. Similarly, in the deuterated methyl methacrylate, hydroquinone monomethyl ether as the polymerization inhibitor is removed and the moisture content is removed up to not more than 80 ppm.

While the mixed solution is filtered with a tetrafluoroethylene membrane filter having accuracy of 0.2 μm, a filtrate is directly injected into the hollow portion of the produced cylindrical pipe.

0.016% by mass di-tert-butyl peroxide (PBD) is dispensed as the polymerization initiator into the monomer mixed solution, and 0.27% by mass n-lauryl mercaptan is dispensed as the chain transfer agent into the monomer solution (chain transfer coefficient is 0.8 in this system).

The cylindrical pipe in which the mixed solution is injected is vertically stood in a pressurized polymerization vessel, while inserted into a glass pipe having the inner diameter larger than the outer diameter of the cylindrical pipe by 9%.

Then, after nitrogen atmosphere is substituted inside the pressurized polymerization vessel, the inside of the pressurized polymerization vessel is pressurized up to 0.005 MPa, and the pressurized polymerization vessel is heated to perform the polymerization at 100° C. for 48 hours.

While the pressurized state is maintained, the heating polymerization and heat treatment were performed at 120° C. for 24 hours. Then, the perform is obtained by slow cooling.

No air bubble caused by volume compression in finishing the polymerization is mixed into the obtained perform.

Wire drawing of the perform is performed by hot stretching at 230° C. to produce a plastic optical fiber element wire having the core diameter of about 300 μm. In the stretching process, the generation of the air bubble is not observed in the perform.

Figure 3:
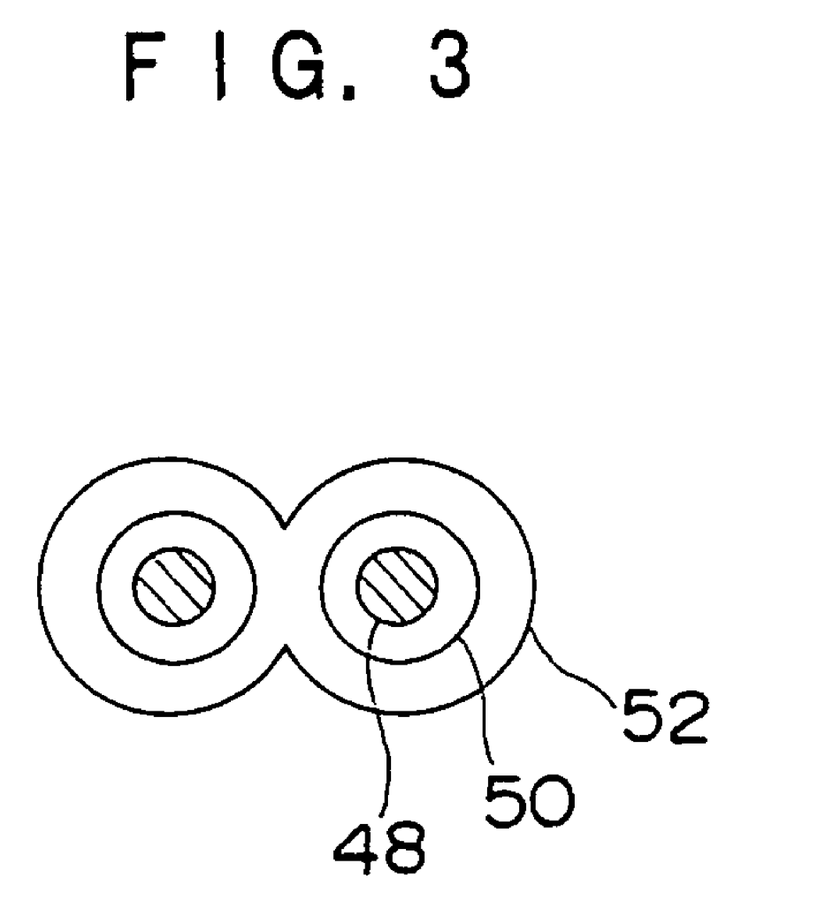
FIG. 3 is a sectional view of a two-core coated optical fiber cable.

As shown in FIG. 3, an element wire 48 is coated with low-density polyethylene (LOPE) at 120° C. by using a coating machine including a normal crosshead die to obtain a coated optical fiber cord having the outer diameter of 1.2 mm, in which a first coated layer 50 is in close contact with a core wire.

The two coated optical fiber cords were coated with polyvinyl chloride (PVC) at 130° C. by using the coating machine including the die different from the die used in the first coated layer 50 to obtain the two-core optical fiber cable in which a short diameter of a sheath layer 52 is 3.2 mm and a long diameter of the sheath layer 52 is 6.2 mm. The two-core optical fiber cable in which aramid fiber is longitudinally added as a tension member to the hollow portion is obtained.

Comparative Example 1

GI-POF is produced in the same way as the first embodiment except normal polymethyl methacrylate which is not deuterated is used for the core composition material.

Comparative Example 2

GI-POF (trade name: "Lucina" manufactured by Asahi Glass Co., Ltd.) is used. The core diameter is 120 μm, and perfluorinated resin is used for the core composition material. Further, VCSEL light source which has the light source wavelength of 850 nm suitable to the perfluorinated resin and has one light-emission point is used. Other conditions were the same as the first embodiment.

Comparative Example 3

The element wire of SI-POF (trade name: SK-10 manufactured by Mitsubishi Rayon Co., Ltd.) having the core diameter of 250 μm is used instead of GI-POF. Other conditions were the same as the first embodiment.

Comparative Example 4

The VCSEL light source which has the light source wavelength of 780 nm and has one light-emission point is used. Other conditions were the same as the first embodiment.

Testing Method

The test is performed to one optical fiber of the two-core optical fiber cable by the following methods.

An axis of the fiber is aligned with VCSEL to be coupled to the light-emission face of VCSEL with the same magnification by using the ball lens. At this point, the coupling efficiency is 0.8 dB.

The transmission loss measurement is performed by a cut back measuring method at the light source wavelength.

The fiber bandwidth measurement is performed by measuring a length of 50 m by a time domain method.

The light source life measurement conditions: the accelerated test is performed at the output of 2 mW and the temperature of 60° C.

The coupling efficiency (on VCSEL light-emission side): the ball lens same-magnification system is used to intentionally shift the axis of the fiber toward an XY direction (direction perpendicular to the axis) by 80 μm, and VCSEL and the fiber were coupled to each other to per formed the measurement.

The mode noise is estimated at a noise level near an eye aperture in the eye pattern at 3 Gbps.

TABLE 1

| | Fiber | | | | |
|---|---|---|---|---|---|
| | Type | Core material | Core diameter | Bandwidth per 50 m length | Transmission loss |
| Example 1 | GI-POF | Deuterated acryl resin | 300 μm | 5.6 GHz | 100 dB/Km |
| Comparative Example 1 | GI-POF | Normal acryl resin | 300 μm | 3.2 GHz | 800 dB/Km |
| Comparative Example 2 | GI-POF | Perfluorinated resin | 120 μm | 5.2 GHz | 80 dB/Km |
| Comparative Example 3 | SI-POF | Normal acryl resin | 250 μm | Not more than 200 MHz | 800 dB/Km |
| Comparative Example 4 | GI-POF | Deuterated acryl resin | 300 μm | 5.6 GHz | 100 dB/Km |

| | Light source wavelength | The number of light-emmission points | Light source life | Coupling efficiency | Mode noise level |
|---|---|---|---|---|---|
| Example 1 | 780 nm | 4 | Not lower than $1 \times 10^5$ hours | 2.0 dB | Small |
| Comparative Example 1 | 780 nm | 4 | Not lower than $1 \times 10^5$ hours | 2.0 dB | -(3 Gbps transmission can not be performed) |
| Comparative Example 2 | 850 nm | 1 | Not lower than $1 \times 10^5$ hours | 5.0 dB | Large |

TABLE 1-continued

| | | | | | |
|---|---|---|---|---|---|
| Comparative Example 3 | 780 nm | 4 | Not lower than $1 \times 10^5$ hours | 2.3 dB | -(3 Gbps transmission can not be performed) |
| Comparative Example 4 | 780 nm | 1 | Not more than $1 \times 10^4$ hours | 2.0 dB | Small |

In Example 1, Comparative Example 1, and Comparative Example 3, since the VCSEL light source having the plurality of light-emission points is used, the life not lower than $1 \times 10^5$ hours at the output of 2 mW is confirmed by the accelerated test of 60° C.

In Comparative Example 4 in which the VCSEL light source has one light-emission point, only the life not more than $1 \times 10^4$ hours is obtained.

The bandwidth of the fiber made of the deuterated acryl resin is 5.6 GHz at 50 m length. It is found that the fiber made of the deuterated acryl resin is sufficiently used for the high-speed transmission.

What is claimed is:

1. An optical signal transmission system comprising:
   a refractive-index profile optical fiber in which a core diameter, of a core outputting an optical signal incident from a first end, that is received from a second end, is not lower than 200 µm;
   a vertical cavity surface emitting laser diode which is arranged at the second end of the optical fiber, the vertical cavity surface emitting laser including a constriction layer of electric current, the constriction layer including an oxidized aperture with a diameter equal to or smaller than 11 µm, the vertical cavity surface emitting laser diode having a plurality of light-emission points, outputting light beams toward an end face of the optical fiber, the vertical cavity surface emitting laser diode outputting the light beams having substantially a same wavelength as a wavelength in which transmission loss of the optical fiber becomes smaller from the light-emission points; and
   a light receiving element which is arranged at the first end of the optical fiber, the light receiving element receiving the light signal outputted from the end face of the optical fiber, wherein
   the vertical cavity surface emitting laser diode includes a plurality of light emission points in which light beams are emitted simultaneously and a divergent angle of the emitted light beams is equal to or smaller than 23 degrees.

2. An optical signal transmission system according to claim 1, wherein a wavelength of the light beam emitted from the vertical cavity surface emitting laser diode ranges from 770 nm to 810 nm.

3. An optical signal transmission system according to claim 1, wherein the plurality of light-emission points are arranged inside an outer periphery of the core at the end face of the optical fiber.

4. An optical signal transmission system according to claim 1, wherein the optical fiber is a refractive-index profile plastic fiber, and a light hydrogen content of a C—H bond in a core polymer of the optical fiber is not more than 60 mg per gram of polymer.

5. An optical signal transmission system according to claim 4, wherein the light hydrogen content of the C—H bond in the core polymer of the optical fiber is made of deuterated polymer or halogenated polymer.

6. An optical signal transmission system according to claim 5, wherein the polymer is a deuterated poly (meth)acrylic ester compound.

7. An optical signal transmission system according to claim 1, wherein the light receiving element is an MSM type photodiode.

8. An optical signal transmission system according to claim 1, wherein the core diameter of the optical fiber ranges from 250 µm to 900 µm.

9. An optical signal transmission system according to claim 1, wherein the divergent angle of the emitted light beam is equal to or smaller than 21 degrees.

10. An optical signal transmission system according to claim 1, wherein the optical fiber is a graded index type plastic optical fiber (GI-POF).

* * * * *